Feb. 20, 1940.  H. E. KENNEDY  2,190,927
FLUID PRESSURE ACTUATED WELDING APPARATUS
Filed May 14, 1937
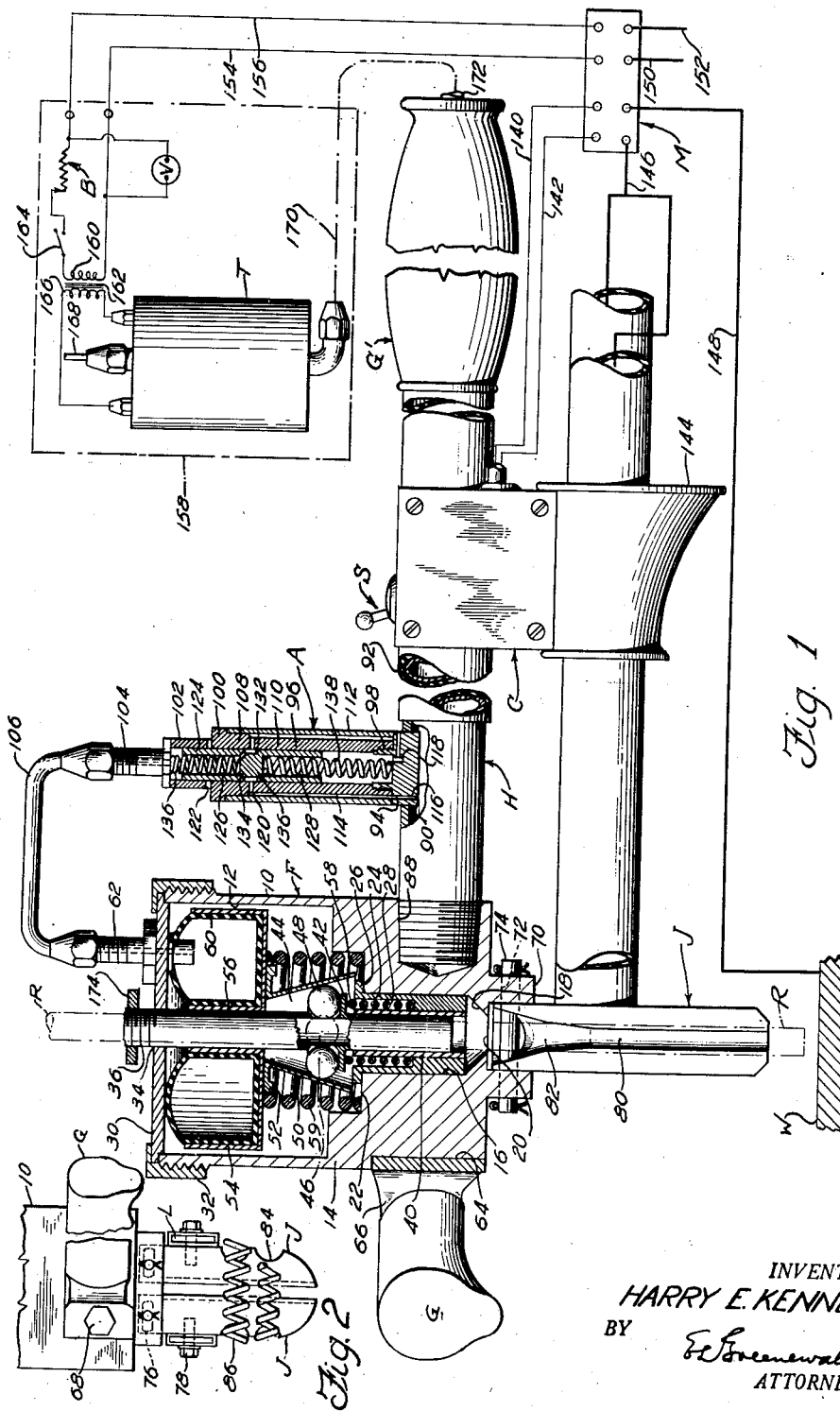
INVENTOR.
HARRY E. KENNEDY
BY
ATTORNEY Patented Feb. 20, 1940

2,190,927

UNITED STATES PATENT OFFICE 2,190,927

FLUID-PRESSURE ACTUATED WELDING APPARATUS

Harry E. Kennedy, Berkeley, Calif., assignor to The Linde Air Products Company, a corporation of Ohio Application May 14, 1937, Serial No. 142,557

11 Claims. (Cl. 219—8)

This invention relates to electric welding and particularly pertains to an electric welding apparatus which includes an automatic control for advancing the welding rod at substantially the rate of its consumption and consequently maintaining a uniform distance between the end of the welding rod and the work.

The welding apparatus embodying this invention is particularly adaptable to the welding process disclosed in U. S. Patent No. 2,043,960 of June 9, 1936. In the said process, welding is accomplished by passing a high amperage electric current from a welding rod to the work to be welded through a granular or finely-divided welding material of high electrical resistance and substantially free from substances evolving deleterious amounts of gas; which material is heaped on the line to be welded in such quantity as to completely submerge the welding operation under a blanket of the welding material.

In practicing this method of welding, it is necessary that the voltage between the welding rod and the work be maintained at a constant fixed value and that the welding rod move relatively to the work. This process has been generally adapted to those applications wherein the welding rod is automatically fed toward the work by motor driven serrated wheels.

In ordinary hand electric welding, the operator can maintain the arc length under constant observation so that manual control of the arc length, and consequently of the voltage between the welding rod and the work, is neither impossible nor difficult. When, as in the above described welding process using the described patented welding material, the welding operation is substantially submerged under the welding material, visual observation of the distance between the end of the welding rod and the work is impossible, and therefore non-automatic hand welding is impracticable when using this welding material. In U. S. Patent No. 1,963,915 issued on June 19, 1934, to H. E. Kennedy et al, is described apparatus for advancing the welding rod toward the work by means of a reciprocating member which engages the welding rod on altering strokes to advance the same in one direction only. The reciprocating member is magnetically operated, and the entire device is extremely light, portable, and suitable for hand operation. With such a device, it becomes entirely possible to operate through a layer of welding material, as in a nonportable fully automatic production machine.

With the large currents necessary in the above described welding process using inorganic welding material, it becomes necessary to use a large diameter welding rod, and this further necessitates the provision of relatively large current carrying contact jaws to conduct the current to the welding rod. In order to insure adequate contact between the current carrying contact jaws and the welding rod, means, such as relatively stiff springs, must be employed to insure the contact jaws engaging the welding rod with the proper pressure. Consequently, when welding with high currents, the increase in the size of the parts of the apparatus and the pressures under which these operate, increase the resistance offered to the passage of the welding rod between the contact jaws. It has, accordingly, been necessary to devise some means for feeding the welding rod between the contact jaws and to the work, which means can develop a great deal of power in proportion to its weight. The increased power is necessary to overcome the resistance to the passage of the welding rod between the contact jaws, and the weight of the device must be limited in order to make the apparatus suitable for hand welding operations.

It is therefore among the objects of this invention to provide an improved, compact, light weight automatic welding apparatus for hand welding operations, which apparatus is operated by a pressure fluid, electrically controlled in accordance with fluctuations in the voltage between the welding rod and work, easily disassembled for inspection of the operating parts thereof, sensitive in operation, capable of use with relatively large currents, and of high power in proportion to its weight; and which apparatus has mounted thereon control means for the supply of welding current and means to enable the operator to hold the apparatus, under rigid control, in any desired position with respect to the work.

These and other novel features of the invention will become apparent from a consideration of the following specification when read in connection with the accompanying drawing, in which:

Fig. 1 is a side view, partially in section, showing an automatic welding tool embodying the invention and a suitable control mechanism therefor; and Fig. 2 is a view of the left end of the apparatus shown in Fig. 1, on a smaller scale.

In the drawing, the welding rod feeding mechanism has been illustrated as embodied in a portable hand tool of dimensions and weight enabling it to be conveniently and efficiently manipulated by an operator. The feeding mechanism, however, need not be embodied in an apparatus which is portable in the same sense as a hand tool. That is to say, the invention is mainly concerned with an electrically controlled device for automatically feeding the rod in one direction at a rate of advance equalling the rate of consumption of the rod, and capable of performing welding operations in which relatively large currents are necessary and comparatively large welding rods are used. While a hand tool such as illustrated has considerable merit in a wide field for use in connection with electric welding, both in the welding process using an inorganic welding material as previously referred to, and in others, some of the novel features of the feeding mechanism may, however, be employed without embodying them in a hand tool.

The specific embodiment of the invention shown comprises a reciprocable welding rod feeding mechanism F for moving the welding rod R toward the work W, to which feeding mechanism is secured an insulating grip G and a pair of electric current carrying contact jaws J. The feeding mechanism F is secured to a suitable support such as a handle H on which is mounted an automatic valve mechanism A, for intermittently supplying pressure fluid to the mechanism F, and a second insulating grip G'. A clamp C, having mounted thereon a welding current remote control switch S, is secured to the handle H for supporting welding current carrying leads L. The control means for the embodiment of the invention shown may comprise a solenoid operated throttling valve T, a rheostat B and a main switch or circuit breaker M, which latter may be magnetically operated by the remote control switch S.

The feeding mechanism F comprises a cylindrical casing 10 having a hollow open upper end 12 and a relatively solid lower end 14 in which is formed an axially extending cylindrical bore or passage 16 having a tapered portion 18 at its lower end which terminates in an aperture 20 slightly larger in diameter than the welding rod R. A relatively large diameter spring seat 22 is formed in the solid lower end 14 of the casing 10 adjacent the upper end of the bore 16. Mounted in the cylindrical portion of the bore 16 is a sleeve 24 having a circumferential flange 26 at its upper end, which engages the spring seat 22, and an enlarged central recess 28 forming a spring seat. A cap 30 is secured to the hollow open upper end 12 of the casing 10 by a threaded retaining ring 32, and is formed with an aperture 34 through which extends a welding rod receiving, supporting, and guiding means 36, which, at its lower end, slidably engages a bushing 40 mounted inside the sleeve 24 and coextensive in length therewith.

Adjacent its central portion, the guide 36 is formed with a circumferential rib 42 conical in cross-section, and forming part of a one-way clutch 44. Extending through the rib 42 are a series of radial apertures 46 in each of which is mounted a ball 48 which may at times be engaged by an outer cone 50 forming the other member of the clutch 44. Outer cone 50 is open at its lower end and at its upper end is provided with a circumferential flange 52 which may be secured to, or formed integral with, a cup-shaped member 54 having an outer diameter slightly less than the internal diameter of the hollow open upper end 12 of the casing 10, and whose inner wall 56 provides a tubular central sleeve which slidably engages the guide 36. A spring 58 at one end engages the rib 42 and at its opposite end is seated in the spring seat formed between the sleeve 24 and the bushing 40 by the recess 28. A second spring 59, surrounding the outer cone 50 and flange 52, engages the cup-shaped member 54 and the spring seat 22.

Mounted in the cup-shaped member 54 is an annular expansible member such as a chamber or tube 60, the upper surface of which engages the cap 30; and through the cap is threaded a nipple 62 extending on the under side of the cap into the expansible tube 60.

The lower front portion of the casing 10 is provided with a flat face 64 to serve as a mounting surface for a clamp 66 forming part of the insulating grip G. The clamp 66 may be secured to the flat face 64 by bolts 68, so that the hand insulating grip G may extend either to the right or to the left in a generally horizontal direction from the casing 10, as desired.

A pair of spaced parallel ribs 70 extend from the bottom of the casing 10 adjacent either side of the aperture 20. Each rib 70 is formed with two apertures 72, in each of which apertures is mounted a pin 74 to each of which is pivotally connected one of the contact jaw plates J by means of a slot 76. A welding current lead L is connected by a bolt 78 to each contact jaw J. Each contact jaw has a groove 80 in its inner longitudinal side for receiving the welding rod R, which groove, as may be seen from Fig. 1, includes an enlarged tapered portion 82 to accurately guide the rod R into the groove 80. In the outer sides of both jaws J are formed two circumferential recesses 84 spaced apart to receive spaced annular tension springs 86 which serve to clamp the contact jaws J against the welding rod R.

The right hand portion of the lower end 14 of the body or casing 10, as viewed in Fig. 1, is provided with a socket 88 in which may be suitably secured one end of the handle H of the apparatus. The handle H includes a central pressure fluid conducting bore 90 which extends from the rear end of the handle nearly to the part of the handle in the socket 88. Surrounding the outside of the handle H between the grip G' and the point where the automatic valve mechanism A is secured to the handle is a suitable insulating covering 92, to protect the operator of the apparatus from any contact with the current carrying parts thereof.

The automatic valve mechanism A comprises a plug 94 secured in a suitable aperture in the handle H. A valve guide 96 is threadedly secured to a nipple 98 formed on the plug 94 and is formed with a circumferential flange 100 adjacent its upper end. Extending upwardly from the circumferential flange 100 is an integral reduced tubular extension 102 to which is secured a nipple 104 connected to a pressure fluid conduit 106 leading to the nipple 62 mounted on the cap 30 and in communication with the expansible tube 60. Below the circumferential flange 100, the valve guide 96 is formed with a short tubular extension 108 of a diameter less than the diameter of the circumferential flange 100 and this short tubular extension 108 terminates in a longer tubular extension 110, the diameter of which is slightly less than the diameter of the extension 108. Engaging the flange 100 and the short tubular extension 108 at one end, and the plug 94 at the opposite end, is a sleeve 112. Because of the reduction in diameter of the extension 110, as compared with that of the extension 108, an annular passage 114 is left between the extension 110 and the sleeve 112. A port 116 extends through the plug 94, and is in communication with the passage 114 at one end and the bore 90 at the opposite end. A right angle port 118 extends from the interior of the valve guide 96 through the plug 94 to the atmosphere. Adjacent the intersection of the tubular extensions 108 and 110 is a series of pressure fluid inlet apertures 120 extending radially through the valve guide 96, and a series of exhaust apertures 122 extends radially through the valve guide 96 adjacent the intersection of the tubular extension 102 and the circumferential flange 100.

A balanced reciprocable valve 124 is slidably mounted in the valve guide 96 and is formed with vertically extending, centrally disposed non-intersecting upper and lower bores 126 and 128. Adjacent the solid central portion 130 of the valve 124 is a circumferential recess 132, and apertures 134 extend between this recess and the upper bore 126. A compression spring 136 is seated in the upper bore 126 and engages the nipple 104, and another compression spring 138 is seated in lower bore 128 and engages the plug 94. These compression springs are so designed that when the apparatus is not operating, the valve 124 will be held in its upper position wherein the inlet apertures 120 register with the recess 132 and the exhaust apertures 122 will be closed by the upper end of the valve 124.

The clamp C secured to the handle H has mounted thereon the remote control switch S, from which a control circuit comprising conductors 140 and 142 extends to the main switch M for controlling the operation of the latter. The welding current carrying leads L are mounted in the lower portion 144 of the clamp C, and these leads are connected to a conductor 146 extending to the switch M. Another conductor 148 extends from the switch M to the metal work W. Through the medium of the switch M, the conductors 146 and 148 are connected to a suitable source of electrical energy which is connected to the switch M through conductors 150 and 152. In the switch M conductors 154 and 156, forming part of a control circuit described in more detail hereinafter are connected in parallel with the welding circuit represented by the conductors 146, 148, 150, and 152.

Conductors 154 and 156 extend from the switch M, where they are connected to conductors 146 and 148, respectively, to the control box 158, where they are connected to the primary winding 160 of a transformer 162. Mounted in the control box 158, and connected in the conductor 156, are a rheostat B and a cutout switch 164. Also mounted in the control box 158 is a voltmeter V which is connected across the conductors 154 and 156. The secondary winding 166 of the transformer 162 is connected to the terminals of the solenoid-operated fluid pressure throttling valve T. This throttling valve may be a plunger operated type in which the intensity of magnetization varies the amount the valve opens. Connected to the throttling valve T are a pressure fluid inlet conduit 168 and a pressure fluid outlet conduit 170, which latter is connected to a suitable nipple 172 mounted in the end of the handle H and in communication with the bore 90 thereof.

The operation of the above described embodiment of the invention is as follows. The resistance of the welding current path between the welding rod R and the work W causes an IR drop between the rod R and the work W. As is well known to those skilled in the art, the voltage drop across a resistance, such as represented by that portion of the current path between the rod R and the work W, may be measured by an instrument connected in parallel with the resistance. A common instance of this procedure is the use of an ammeter shunt to measure the flow of current in any electrical circuit. In this manner, the voltage drop between the rod R and the work W is measured by the control circuit including the conductors 154 and 156. Fluctuations in the voltage between the welding rod R and the work W are thus impressed upon the solenoid of the throttling valve T, either through the medium of the transformer 162, as illustrated, or directly. These voltage fluctuations cause a corresponding variation in the amount the throttling valve is opened and thereby the throttling valve will vary the pressure at which fluid, such as compressed air, is supplied from the pressure fluid inlet conduit 168 to the pressure fluid outlet conduit 170 and thus to the bore 90 of the handle H. Pressure will thus be built up in the automatic valve mechanism A in accordance with the amount the throttling valve T is open. Fluid enters the automatic valve mechanism A through the port 116 and passes through the annular passage 114 and pressure fluid inlet apertures 120 into the circumferential recess 132, from which it passes through the apertures 134 into the upper bore 126, and thence through the nipple 104, pressure fluid conduit 106 and nipple 62 to the interior of the expansible tube 60. As pressure builds up within the expansible tube 60, the latter is inflated thus forcing the clutch 44 downwardly. In this downward movement, the outer cone 50 first moves the balls 48 radially inwardly to thereby grip the welding rod R, after which the outer cone 50, the guide 36 and the rod R move downwardly as a unit to the position illustrated in Fig. 1.

When sufficient pressure has been built up within the expansible tube 60 and the connections between this tube and upper bore 126 to overcome the force of spring 138, the valve 124 will be moved downwardly thus closing off the pressure fluid inlet apertures 120 to terminate pressure building within the tube 60. This movement will be assisted by the action of springs 58 and 59 on the clutch 44 and that of spring 136 on the valve 124. After the valve 124 has moved downwardly a sufficient distance, the exhaust apertures 122 will be in communication with the upper bore 126. Pressure fluid will then be exhausted to atmosphere from the expansible tube 60 causing the tube to deflate, and the springs 58 and 59 will continue to move the clutch 44 upwardly until the cup-shaped member 54 engages cap 30. In its upward movement, the outer cone 50 will first allow the balls 48 to move radially outwardly and thus disengage the rod R after which the clutch 44 will move upwardly as a unit. During this upward movement, the rod R is retained in stationary position by the clamping action of the jaws J. When the pressure has dropped to a predetermined value the spring 138 will again move the valve 124 to the upper position illustrated and the cycle of operation will be repeated.

The rapidity of the above described cycle of operation depends entirely upon the pressure of the fluid supplied to the automatic valve mechanism A. This pressure is determined by the throttling valve T, which responds to fluctuations in the voltage between the welding rod R and the work W to vary the pressure at which fluid is supplied to the tube 60, thus varying the rate of reciprocation of the clutch 44. Thus the rate of feeding the welding rod to the work is directly proportional to the rate of its consumption, and the consequent increase in voltage between the welding rod and the work. A knurled nut 174 is secured to the upper end of the welding rod guide 36 so that the welding rod may be moved at will by hand when it is so desired.

The remote control switch S allows the operator to connect and disconnect the supply of welding current to the apparatus and to the work at will, through distant operation of the main switch M. If it is desired to weld non-automatically, the cutout switch 164 may be opened and the control mechanism will then no longer automatically control the feeding of the welding rod to the work.

The voltage at which it is desired to operate may be adjusted by means of the rheostat B, and this voltage is indicated by the voltmeter V. If it is desired to weld at 30 volts, for instance, the rheostat B may be adjusted until the voltmeter V reads 30 volts. The throttling valve T then maintains the pressure at which fluid is supplied at a value sufficient to cause the clutch 44 to move the rod R at the correct rate to maintain the voltage between the rod and the work at 30 volts. If a rapid movement of the hand of the operator retracts the tool so that the drop in potential between the rod and the work exceeds 30 volts, the air pressure will automatically be increased, depending upon how much this excess may be, until the required 30 volt drop has again been attained.

The particular disposition of the hand grips G and G' on the apparatus assures the weight of the operating parts being substantially evenly distributed. The feeding mechanism F, the automatic valve mechanism A and the clamp C, having mounted thereon the control switch S and supporting the welding current carrying leads L, are all disposed between the grips G and G', the axes of which are at substantially right angles to each other. This substantially balanced distribution of the elements of the apparatus between the points of support enables the operator to perform the welding operation with less possibility of fatigue, and, consequently, greatly increased efficiency. Furthermore, the adjustable grip G permits the apparatus to be quickly adapted for use by either a right-handed or a left-handed operator. In addition, the operator is adequately protected from accidental contact with the exposed current carrying parts of the apparatus by the grips G and G' and the insulating covering 92.

While a specific embodiment of the novel features of the invention has been shown, the invention may be otherwise embodied and the relative dimensions and interrelation of parts changed, provided the objects of the invention are attained.

What is claimed is:

1. A welding apparatus including means for receiving and supporting a welding rod; an expansible member; means for intermittently supplying pressure fluid to said expansible member; reciprocable means operatively associated with said expansible member and adapted to directly engage the welding rod on alternate strokes to advance the same; and means, responsive to fluctuations in the voltage between the welding rod and the work, to vary the pressure at which fluid is supplied to said expansible member.

2. A welding apparatus including means for receiving and supporting a welding rod; an expansible member, means for intermittently supplying pressure fluid to said expansible member; reciprocable means operatively associated with said expansible member and adapted to directly engage the welding rod on alternate strokes to advance the same; and means to retain the welding rod against movement on intermediate strokes of said reciprocable means.

3. A welding apparatus including means for receiving and supporting a welding rod; an expansible member; reciprocable means operatively associated with said expansible member and adapted to directly engage the welding rod on alternate strokes to advance the same; and an automatic valve for intermittently supplying pressure fluid to said expansible member.

4. A welding apparatus including means for receiving and supporting a welding rod; an expansible member; reciprocable means operatively associated with said expansible member and adapted to directly engage the welding rod on alternate strokes to advance the same; an automatic valve for intermittently supplying pressure fluid to said expansible member; and means, responsive to fluctuations in the voltage between the welding rod and the work, for varying the pressure at which said pressure fluid is supplied.

5. A welding apparatus including means for receiving and supporting a welding rod; an expansible member; reciprocable means operatively associated with said expansible member; and adapted to directly engage the welding rod on alternate strokes to advance the same; means for retaining the welding rod against movement on intermediate strokes of said reciprocable means; and means, responsive to fluctuations in the voltage between the welding rod and the work, for varying the pressure at which pressure fluid is supplied intermittently to said expansible member.

6. A portable welding apparatus including a support; a welding rod guiding and feeding means secured to one end of said support; a hand grip adjustably secured to said guiding and feeding means and extending substantially at right angles to the axis of said support; a second hand grip coaxially secured to the opposite end of said support; a welding current conductor supporting clamp secured to an intermediate portion of said support; and a welding current control switch mounted on the upper portion of said clamp.

7. Welding apparatus comprising in combination, a support; a welding rod feeding means secured to one end of said support; a first grip adjustably secured to said feeding means; a welding current conductor supporting clamp secured to an intermediate portion of said support and depending therefrom; and a second grip coaxially secured to the opposite end of said support, the axes of said support, said feeding means and said first grip being arranged respectively at right angles to each other.

8. In combination, a portable welding apparatus; a control means therefor; and a main circuit breaker; said portable welding apparatus including a body and a handle extending therefrom; a pressure fluid operated one-way clutch mounted in said body to receive and support a welding rod and advance the same toward the work; an automatic valve mounted on said handle for intermittently supplying pressure fluid to said clutch; a fluid conduit in said handle; a fluid conduit extending from said automatic valve to said body; and a fluid conduit extending from said handle to said control means; said control means including means for predetermining and indicating the voltage drop between the welding rod and the work; and means, responsive to fluctuations in said predetermined voltage, for varying the pressure at which pressure fluid is supplied to said clutch; a conductor extending from said circuit breaker to the work to be welded; a second conductor extending from said circuit breaker to the welding rod; a clamp mounted on said handle and supporting said second conductor; a switch mounted on said clamp; a control circuit extending between said switch and said circuit breaker; and a second control circuit extending from said circuit breaker to said control means.

9. A portable welding apparatus including a body and a handle extending therefrom; a pressure fluid operated one-way clutch mounted in said body for receiving and supporting a welding rod and advancing the same toward the work; a pair of contact jaw plates movably mounted on said body and each provided with a tapered groove to receive said welding rod; resilient means for urging said contact jaw plates into engagement with said welding rod; an automatic valve mounted on said handle for intermittently supplying pressure fluid to said clutch; a conduit connecting said automatic valve to said body; a conduit disposed in said handle and connecting said automatic valve to a source of pressure fluid; electric conductors extending from a source of current to said contact jaw plates; means secured to said handle for supporting said conductor; and a remote control switch mounted on said last-named means.

10. Welding apparatus comprising in combination, a casing having a passage extending axially therethrough and adapted to receive a welding rod; a reciprocable one-way clutch mounted in said casing and adapted to engage a welding rod on alternate strokes to advance the same in one direction; an annular expansion chamber in said casing operatively associated with said clutch; and means for alternately inflating and deflating said expansion chamber.

11. The combination claimed in claim 10, in which said means comprises a balanced reciprocable valve adapted alternately to admit pressure fluid to said expansion chamber and to exhaust the same to atmosphere.

HARRY E. KENNEDY.